United States Patent [19]

Gumb et al.

[11] Patent Number: 5,086,466
[45] Date of Patent: Feb. 4, 1992

[54] TELEPHONE BASE STRUCTURES FOR STABILIZING UPON SUPPORT SURFACES

[75] Inventors: Beverley W. Gumb; Edward J. R. Foster, both of London, Canada

[73] Assignee: Northern Telecom Limited, Montreal, Canada

[21] Appl. No.: 504,210

[22] Filed: Mar. 22, 1990

[51] Int. Cl.⁵ .............................................. H04M 1/00
[52] U.S. Cl. ..................... 379/440; 379/419; 379/428; 379/441; 379/454
[58] Field of Search ............... 379/319, 428, 434, 435, 379/436, 437, 440, 441, 450, 454, 419; 439/347, 395

[56] References Cited

U.S. PATENT DOCUMENTS

| | | | |
|---|---|---|---|
| 3,859,476 | 1/1975 | Morrell et al. | 379/454 |
| 4,491,696 | 1/1985 | Haskus et al. | 379/454 |
| 4,617,428 | 10/1986 | Gala et al. | 379/454 |

FOREIGN PATENT DOCUMENTS 0104252 5/1987 Japan .................................. 379/454

OTHER PUBLICATIONS

Crawford, "Lock-In Grommet", Western Electric Technical Digest #47, Jul. 1977.

*Primary Examiner*—James L. Dwyer
*Assistant Examiner*—William Cumming
*Attorney, Agent, or Firm*—R. J. Austin

[57] ABSTRACT

A telephone base structure having an underwall and another wall overlying the underwall. Spaced-apart cantilever beams in the underwall carry support feet at free ends of the beams. The beams are resiliently flexible upwards for the purpose of stabilizing the base structure upon a support surface with the overlying wall acting as a stop to limit the upward movement of the beams.

7 Claims, 1 Drawing Sheet

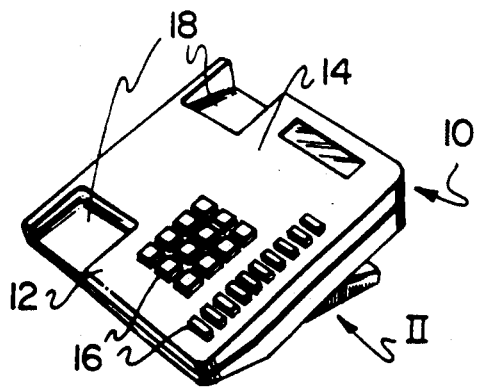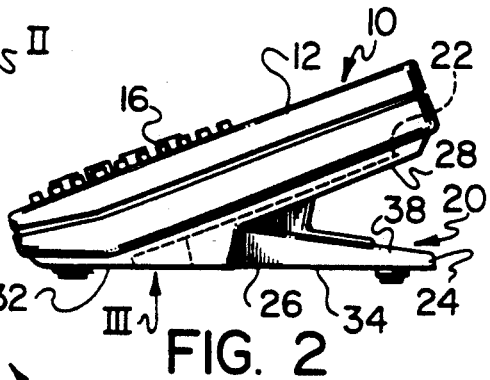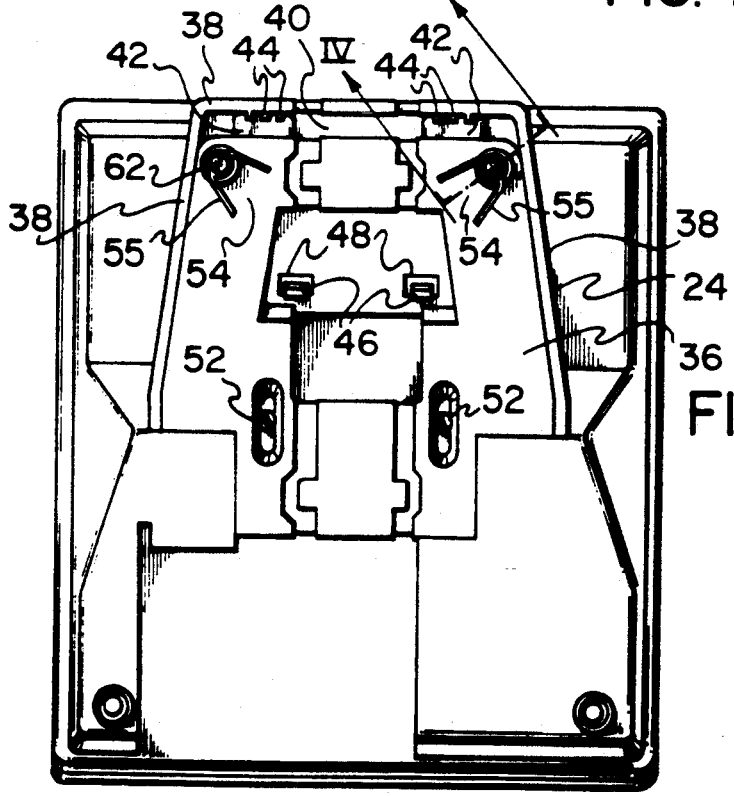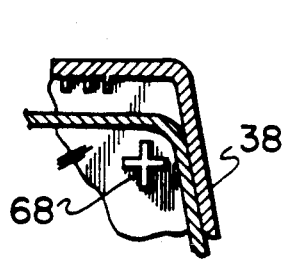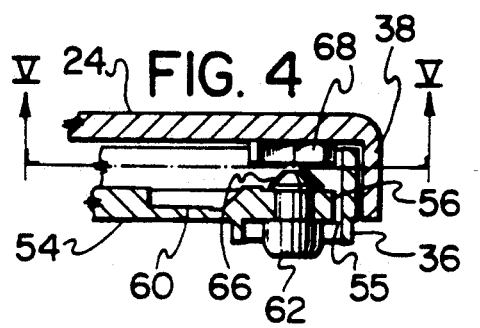

TELEPHONE BASE STRUCTURES FOR STABILIZING UPON SUPPORT SURFACES

BACKGROUND OF THE INVENTION

1. Field of the Invention

This invention relates to telephone base structures.

2. Background Art

A telephone comprises a handset and a base structure for supporting a handset. The base structure may comprise a single base member or a base member and a support member for the base member and which holds the base member in a particular orientation relative to a supporting surface such as a desk top. In all forms of base structure, it is a customer requirement that the structures are stably supported upon horizontal support surfaces as a rocking unstable movement may be aggravating. Where a structure has no support member for the base member, an instability problem may not be present, because of manufacturing controls. Nevertheless distortion of parts of a base member during shrinkage after molding may result in an non-planar underwall which cannot provide simultaneous contact in all required positions with a horizontal support surface to prevent a rocking motion of the base member during use of the telephone. In structures where a support member is provided, this may be detachable from the base member for the purpose of enabling the base member to be supported in different angles of orientation either upon a horizontal support surface or upon a wall. Support instability problems upon horizontal surfaces increase, with use of detachable support members where an underwall of the base structure is provided by an underwall portion of the base member and an underwall portion of the detachably mounted support member as these underwall portions need to be perfectly coplanar to prevent support instability. Assembly tolerances add to the shrinkage problems after molding to aggravate in the support problem in this type of base structure.

The present invention seeks to provide a telephone base structure which avoids or minimizes the support instability problem.

SUMMARY OF THE INVENTION

The present invention provides a telephone base structure having an underwall formed with a plurality of spaced-apart resilient cantilever beams, the cantilever beams being resiliently flexible in an upward direction and having free end regions and a support foot carried by each free end region, each support foot extending downwardly from the underwall.

When the base structure according to the invention, is supported upon a horizontal surface, the cantilever beams flex upwardly under the weight of the base structure so that the structure is resiliently supported on the horizontal surface. Hence, if the base structure is not supported initially upon all of the support feet, those support feet which are providing initial support cause their resilient cantilever beams to flex sufficiently to allow the structure to settle towards the support surface thereby ensuring that all of the support feet finally support the structure upon the surface. Thus, with the structure flexibly supported at all the required positions, no support instability problem arises.

In a base structure according to the invention and having a base member and a support member each of which provides a portion of the underwall, at least one of the resilient cantilever beams together with its corresponding support foot is provided upon each underwall portion.

BRIEF DESCRIPTION OF THE DRAWINGS

An embodiment of the invention will now be described by way of example with reference to the accompanying drawings, in which:

FIG. 1 is an isometric view of a telephone base structure according to the embodiment;

FIG. 2 is a view of the structure of FIG. 1 taken in the direction of arrow II in FIG. 1;

FIG. 3 is an underside view of the base structure taken in the direction of arrow III in FIG. 2;

FIG. 4 is a cross-sectional view through a part of the base structure taken along line IV—IV in FIG. 3; and FIG. 5 is a cross-sectional view of the base structure taken along line V—V in FIG. 4.

DESCRIPTION OF THE PREFERRED EMBODIMENT

According to the embodiment, a molded plastic telephone base structure 10, shown in FIGS. 1 and 2, comprises a telephone base member 12 which houses telephone circuitry and is provided upon an upper visual face 14 with dialing buttons 16 and a molded region 18 for supporting a telephone handset (not shown). The base structure also comprises a molded plastic support member 20 which is formed with two divergent wings 22 and 24 extending from a junction region 26. As shown in FIGS. 2 and 3, the support member 20 is mounted upon the body member 12 by the reception of the wing 22 (shown in chain-dotted outline) within a recess formed in a lower surface region 28 of the base member 12. In the assembled condition, as can be seen from FIGS. 2 and 3, an underwall of the base structure is provided by an underwall portion 32 of the base member 12 and an underwall portion 34 of the support member 20. These underwall portions 32 and 34 are ideally intended to be coplanar with one another, but because of manufacturing tolerance problems, exact coplanarity may not be achieved.

The support member 20 is a sub-assembly in that the two wings 22 and 24 are molded integrally as one part of the sub-assembly and another part 36 of the sub-assembly provides the underwall portion 34. Downwardly depending walls 38 of the wing 24 lie on three sides of a recess 40 in the underside of the wing 24 and this recess accommodates the part 36. The part 36 is mounted into the recess 40 firstly by the reception of two projections 42 at one end of the part 36, behind retaining flanges 44 of the wing 24 and secondly by two latches 46 of the wing 24 which extend through apertures 48 in the part 36 and latch over an outside surface of the part 36.

The wing 22 of the support member 20 is held at its free end to the base member 12 by the use of projections and flanges (not shown) similar to the projections 42 and flanges 44 for connecting the part 36 to the support member 20. In addition to this, the support member 20 is secured to the base member 12 by two spaced apart screws 52 passing through aligned holes in the part 36 and through the junction region 26 into screw-threaded engagement with the base member.

As has been indicated, the assembly of the parts of the base structure cannot ensure that the two underwall portions 32 and 34 are indeed coplanar for supporting purposes. To ensure that the base structure is supported without instability problems, the underwall is formed with a plurality of spaced-apart resilient cantilever beams 54 located towards two corners of the part 36.

As shown particularly in FIG. 3, each cantilever beam 54 is formed within an outside boundary of the part 36 and is provided by the provision of a U-shaped slit 55 during molding of each underwall portion, the U-shaped slit 55 extending along two sides of and around the free end 56 of the beam to form a space between the beam and surrounding parts of the underwall. Hence, each cantilever beam extends from a fixed end towards the free end 56 while being directed outwardly in a general direction towards a corner of the part 36.

Each cantilever beam 54 is slightly tapered towards its free end 56 and has a neck portion 60 spaced from the free end to allow for resilient flexing of the beam in a position spaced from the free end. The neck portion 60 may be provided either through the thickness of each cantilever beam or across its width. However, in this embodiment the neck portion 60 is formed during molding, in the thickness direction of its cantilever beam. The neck portion 60 extends across the full width of the beam and along part of the length of the beam directly from the fixed end 58 of the beam. Each cantilever beam is designed to resiliently flex at the neck portion 60 under the weight of the base structure for the purpose of stabilizing the support of the structure as will be described.

At a free end region of each beam, there is provided a support foot 62 which extends downwardly from the beam 52 and is received in grommet fashion through a hole 64 in the beam. The foot 62 has an upper portion 66 lying above the beam. So as to limit the upward resilient flexing movement of each beam 54, a stop 68 is disposed above the upper part 66 of each foot 62 and is spaced from the part 66 in a non-flexed condition of the foot, as shown in FIG. 4. Each stop 68 is conveniently formed upon the wing 24.

Two other support feet 64 are disposed upon rigid (i.e. non-cantilevered) regions of base member 12 at remote corners of underwall portion 32.

In use of the base structure 10, when it is located upon a horizontal support surface such as a desk surface, as shown in FIG. 2, then the weight of the structure is distributed to the four feet 62 and 64 and causes the cantilever beams 54 to flex upwardly towards the stops 68. If the underwall is not coplanar or if the support surface is not coplanar then as the structure is lowered onto the support surface, it is conceivable that all of the feet 62 and 64 will not engage the support surface simultaneously. In this case, the cantilever beams 54 are caused to resiliently flex upwards under the total weight until all of the feet contact the horizontal support surface. In this case, one of the beams 54 may flex to a greater degree than the other while ensuring that the base structure is supported upon all of the feet 62 and 64 so as to be stable upon the support surface. The resilient flexing movement takes place mainly at the neck portion 60 of the beam so that any flexure is negligible at the foot carrying free end region of the beam.

As may be seen from the above embodiment, the use of the spaced resilient cantilever beams ensures that the base structure is always stable upon any horizontal support surface upon which it is located. This stability is also ensured in a case, as described in the embodiment, in which the base structure is formed with a detachable support member for a base member with the underwall of the structure provided by both the base and support members.

What is claimed is:

1. A telephone base structure having an underwall formed with a plurality of spaced apart resilient cantilever beams, the cantilever beams being resiliently flexible in an upward direction and having free end regions and support feet carried by each free end region, each support foot extending downwardly from the underwall, the base structure also having a further wall which overlies and is spaced above the underwall, the further wall providing a stop disposed above the free end region of each cantilever beam so that the free end region moves towards the stop during upward resilient flexing movement of the beam to limit the amount of the upward movement.

2. A telephone base structure according to claim 1 wherein each cantilever beam has a neck portion of smaller cross-section than the free end region, the neck portion spaced from the free end region to allow for resilient flexing of the beam at the neck portion.

3. A telephone base structure according to claim 2 wherein at each neck portion, each beam is thinner than at the free end region.

4. A telephone base structure according to claim 1 wherein, in a view onto a face of the underwall, each cantilever beam tapers towards its free end region.

5. A telephone base structure according to claim 1 wherein each cantilever beam is formed within a boundary of the underwall and each cantilever beam is separated from the underwall along he length of the beam by a space.

6. A telephone base structure according to claim 1 wherein each foot comprises a plastics element mounted upon the free end region of its corresponding cantilever beam.

7. A telephone base structure according to claim 1 comprising a base member and a support member for supporting the base member upon a horizontal surface, the base member comprising one part of the underwall and the support member comprising another part of the underwall, each underwall part comprising at least one of the spaced-apart resilient cantilever beams.

* * * * *